(12) United States Patent
Bisson et al.

(10) Patent No.: US 6,292,605 B1
(45) Date of Patent: Sep. 18, 2001

(54) RECONFIGURABLE OPTICAL FILTERING APPARATUS AND A DROP-AND-INSERT MULTIPLEXER INCORPORATING SUCH APPARATUS

(75) Inventors: Arnaud Bisson, Orsay; Franck Bruyere, Paris; Ludovic Noirie, Bagneux, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/501,996

(22) Filed: Feb. 11, 2000

(30) Foreign Application Priority Data

Feb. 18, 1999 (FR) .................................. 99 01 983

(51) Int. Cl.⁷ ...................................... G02B 6/293
(52) U.S. Cl. ................... 385/24; 385/16; 359/128
(58) Field of Search .................. 385/16, 17, 24; 359/128

(56) References Cited

U.S. PATENT DOCUMENTS

| | | | |
|---|---|---|---|
| 3,990,780 | * 11/1976 | Dakss | 350/96 |
| 5,712,932 | 1/1998 | Alexander et al. | |
| 6,084,992 | * 7/2000 | Weber et al. | 385/24 |

FOREIGN PATENT DOCUMENTS 2 735 931 A    12/1996 (FR) .

OTHER PUBLICATIONS

Ellis, A. D. et al.: "Dispersion Compensating, Reconfigurable Optical Add Drop Multiplexer Using Chirped Fibre Bragg Gratings" Electronics Letters, vol. 33, No. 17, Aug. 14, 1997, p. 1474/1475, XP000739532 ISSN: 0013–5194.

Zhong W. D., et al: "Reconfigurable Multichannel Add-–Drop Multiplexer with Improved Performance" Electronics Letters, vol. 32, No. 16, Aug. 1, 1996 p. 1477/1478, XP000624476 ISSN: 0013–5194.

Toba H. et al.: "An Optical FDM –Based Self–Healing Ring Network Employing Arrayed Waveguide Grating Filters and EDFA'S with Level Equalizers" IEEE Journal on Selected Areas in Communications vol., 14, No. 5, Jun. 1, 1996 pp. 800–813, XP000590716, ISSN: 0733–8716.

* cited by examiner

*Primary Examiner*—John D. Lee
*Assistant Examiner*—Jerry T Rahll
(74) *Attorney, Agent, or Firm*—Sughrue, Mion, Zinn, Macpeak & Seas, PLLC

(57) ABSTRACT

In particular for selectively dropping and/or inserting channels of a wavelength division multiplex, while minimizing losses, the apparatus includes n̲ stop filters and optical switching means provided with n+1 inlet ports of ranks 0 to n, and n+1 outlet ports of ranks 1 to n+1, as well as a set of waveguides making it possible to couple each outlet port selectively to one of said inlet ports of lower rank. Each filter is provided with first and second opposite ports coupled respectively to an associated outlet port and to an associated inlet port of the same rank. Application to optical transmission, in particular for performing routing operations.

7 Claims, 2 Drawing Sheets

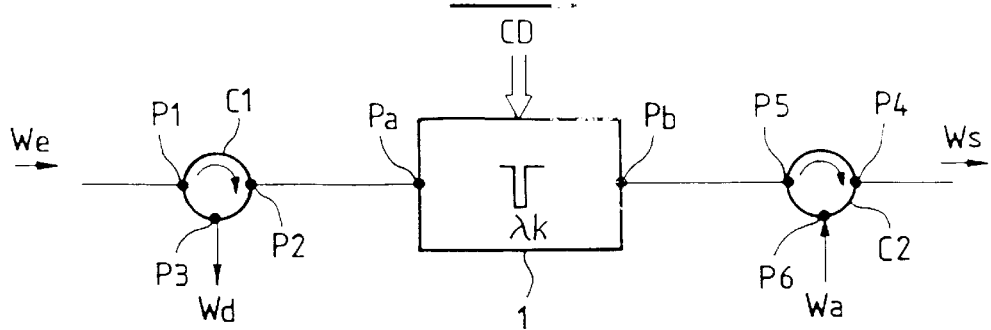
FIG_1 PRIOR ART
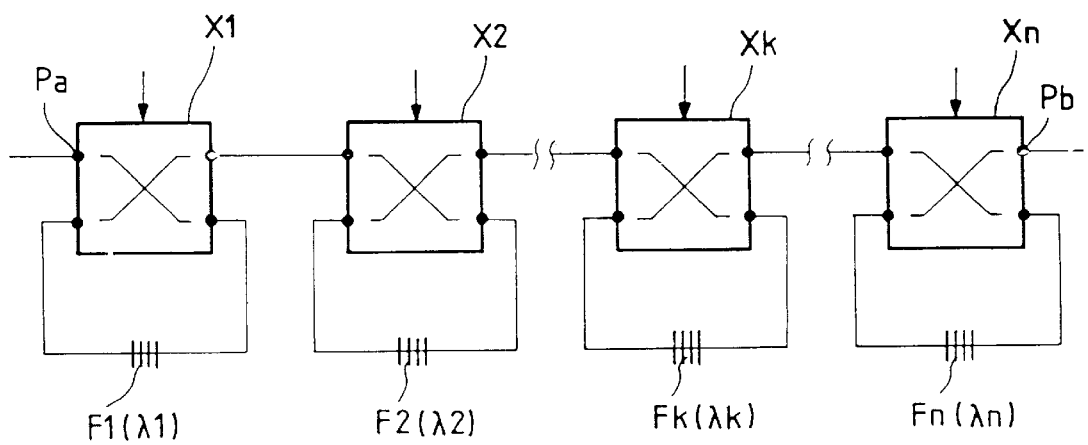
FIG_2 PRIOR ART
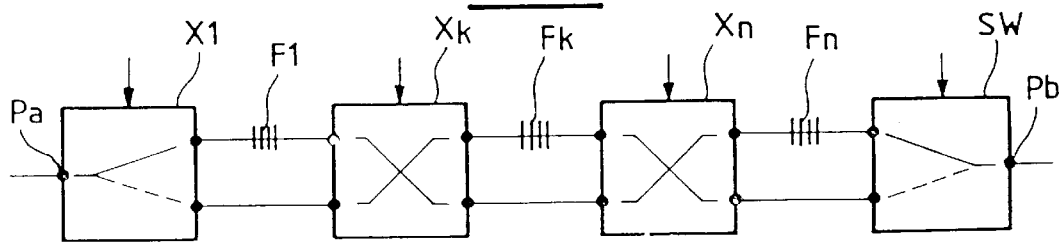
FIG_3 PRIOR ART

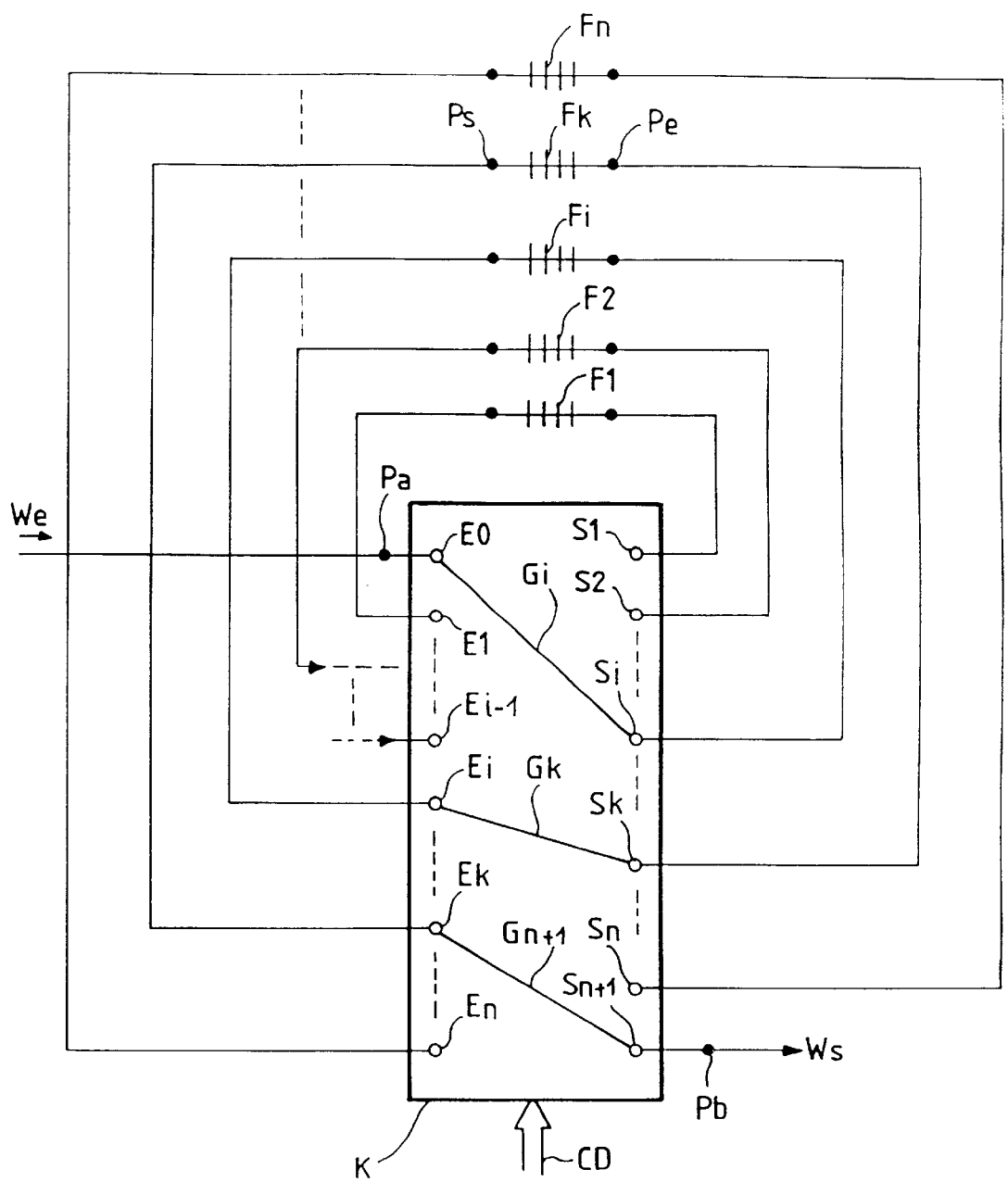

RECONFIGURABLE OPTICAL FILTERING APPARATUS AND A DROP-AND-INSERT MULTIPLEXER INCORPORATING SUCH APPARATUS

The invention lies in the field of optical transmission using wavelength division multiplexing (WDM). It relates to wavelength filtering apparatus and more particularly to reconfigurable filters for selectively removing one or more channels of the multiplex. The invention also relates to apparatus that makes it possible selectively to drop and/or to insert at least some of said channels. Such apparatus may commonly be referred to as a "drop-and-insert" multiplexer and may advantageously use such reconfigurable filters.

BACKGROUND OF THE INVENTION

In WDM transmission systems, a plurality of channels are conveyed simultaneously over the same fiber, each of the channels being carried by an associated wave having a determined center wavelength and a determined bandwidth. In particular, for performing routing or switching functions, it is often necessary to drop certain channels and to modify the multiplex, e.g. so as to modify the information conveyed by one or more channels, or so as to replace the wavelength carrying the information with some other wavelength.

As shown diagrammatically in FIG. 1, in order to implement a drop-and-insert multiplexer, it is possible to use a stop filter 1 associated with drop coupling means C1 and with insert coupling means C2. The filter is organized to prevent transmission of at least one of the wavelengths $\lambda k$ of the multiplex, and also to reflect it/them towards the drop coupling means C1. The drop-and-insert multiplexer becomes reconfigurable if the filter is itself reconfigurable as a function of a channel selection command CD.

In the example shown, the multiplexer is essentially constituted by the reconfigurable filter 1 provided with two opposite access ports Pa, Pb. The ports Pa and Pb are coupled respectively to the inlet coupling means C1 and to the outlet coupling means C2. In this example, the coupling means are three-port circulators. The inlet circulator C1 is provided with an inlet port P12 suitable for receiving an input multiplex We. A second port P2 is coupled to the first access port Pa of the filter 1. A third port P3 constitutes a drop port. The circulator C1 is disposed in a manner such as to enable the input multiplex We to be fed into the filter 1 via the first access port Pa, while the wave Wd reflected by the filter 1 and exiting via the same port Pa is received by the port P2 so as to be taken via the drop port P3.

In the same way, the outlet circulator C2 is provided with a first port P5 coupled to the filter 1 via the second access port Pb. A second port P4 of the circulator C2 makes it possible to take the wave exiting from the filter via the port Pb. The port P4 constitutes an outlet port making it possible to take an output multiplex Ws. Finally, the circulator C2 is provided with a third port P6 which constitutes an insert port.

As a function of the command CD that is applied, the filter 1 is configured to have a stop comb or band set to one or more determined wavelengths $\lambda k$ of the multiplex.

In operation, an input multiplex We is fed in via the inlet port P1. The channels Wd of the multiplex that are carried by the wavelengths stopped by the filter are than dropped and accessible via the drop port P3. In addition, by injecting new signals Wa carried by the same wavelengths via the insert port P6, corresponding channels are inserted into the output multiplex Ws.

Conventional solutions for making a reconfigurable filter use fixed elementary filters associated with 2-to-2 optical switches of the "crossbar" type.

FIG. 2 shows a first conceivable example of such a solution.

The filter includes n 2-to-2 switches X1, X2, Xk, Xn connected in cascade so that one of the outlets of each switch is connected to one of the inlets of the next switch. In addition, the second inlet of each switch is connected to its second outlet via an associated stop filter F1, F2, Fk, Fn. Generally, each of the filters is organized to reflect a single one of the wavelengths $\lambda 1$, $\lambda k$, $\lambda n$ of the inlet multiplex We, but for certain applications, it is also possible to use stop filters that stop combs of wavelengths corresponding respectively to determined subsets of channels.

For example, the 2-to-2 optical switches include moving optical waveguides, such as fiber segments, that can be actuated electro-mechanically, e.g. by means of electric micromotors or piezoelectric elements. The coupling between switches uses optical fibers and the stop filters can be made in the form of Bragg gratings photo-inscribed in the coupling fibers.

FIG. 3 shows another example based on a 1-to-2 optical switch X1, 2-to-2 optical switches Xk, Xn, and a 2-to-1 optical switch SW. In this example, the second outlet of each of the $\underline{n}$ first switches is connected to the second inlet of the next switch via a stop filter.

As explained in detail below, those solutions suffer from the drawback of not being optimal with respect to the insertion losses generated by the switches.

OBJECTS AND SUMMARY OF THE INVENTION

An object of the invention is to remedy that drawback.

To this end, the invention provides optical filtering apparatus including $\underline{n}$ stop filters set to different wavelengths or to different combs of wavelengths, and optical switching means having a plurality of states and suitable for coupling an input optical signal to any one of said filters or to a plurality of said filters selectively coupled in cascade, wherein said switching means are provided with n+1 inlet ports of ranks 0 to n, and n+1 outlet ports of ranks 1 to n+1, as well as a set of waveguides making it possible to couple each outlet port selectively to one of said inlet ports of lower rank, wherein, with each of said filters being provided with first and second opposite ports, the first port and the second port of each filter are coupled respectively to an associated outlet port and to an associated inlet port of the same rank of said switching means, and wherein the inlet port of rank 0 is organized to receive said input optical signal, and the outlet port of rank n+1 is organized to deliver an output optical signal.

The switching means may be constituted by an (n+1)-to-(n+1) optical switch of the usual "crossbar" type. However, such a solution is not optimum as regards complexity and cost. A crossbar switch has (n+1)! possible states and must make it possible to couple any inlet port to any outlet port, which corresponds to $(n+1)^2$ possibilities for optical links between inlet ports and outlet ports. For the application considered, $2^n$ states suffice because the order in which the selected filters are cascaded does not matter. That observation leads to possibilities for simplification as regards implementing the switching means in which it suffices to provide $(n+1)(n+2)/2$ possible optical links.

Thus, with a usual static crossbar switch constituted by n+1 1-to-(n+1) couplers interconnected with n+1 (n+1)-to-1 couplers via waveguides provided with controlled optical gates, the number of waveguides used is in fact only $(n+1)(n+2)/2$. It is thus possible to reduce the number of waveguides and the number of gates accordingly.

More precisely, in an advantageous configuration of the invention, said switching means are not organized to be capable of coupling each outlet port to said inlet ports having ranks higher than or equal to the rank of said outlet port.

Similarly, if an optical switch is used that is implemented by means of moving optical waveguides that are actuated electro-mechanically, an (n+1)-to-(n+1) switch of the usual crossbar type requires the switch to have n+1 waveguides in respective distinct planes so as to enable the waveguides to cross over one another. The reduction in the number of possible optical links to be provided may also be used advantageously to avoid this constraint.

Thus, in another aspect of the invention, the couplings between said filters and said switching means are organized such that no waveguide of said set of n+1 waveguides crosses over any other waveguide, regardless of the state of said switching means.

Advantageously, said switching means are organized such that each inlet port of rank $\underline{k}$ is placed facing the outlet port of rank k+1.

The invention further provides selective drop and/or inert apparatus for selectively dropping and/or inserting one or more channels of a wavelength division multiplex, and incorporating filtering apparatus of the invention.

The drop and/or insert apparatus comprises:

reflective stop optical filtering apparatus of the invention provided with first and second opposite access ports;

inlet coupling means coupled to said first access port and provided with an inlet port suitable for receiving said multiplex and with a drop port, said inlet coupling means being organized to inject at least some of the waves received via its inlet port into the filter, and to emit, via its drop port, at least some of the waves received from said first access port; and outlet coupling means coupled to said second access port and provided with an outlet port and an insert port, said outlet coupling means being organized to inject at least some of the waves received via its insert port into the filter, and to emit, via its outlet port, at least some of the waves received from said second access port.

Naturally, the invention also provides drop apparatus for dropping only, and insert apparatus for inserting only. In such drop apparatus, the outlet coupling means are not provided with an insert port. In such insert apparatus, the inlet coupling means are not provided with a drop port.

BRIEF DESCRIPTION OF THE DRAWINGS

Other aspects and advantages of the invention appear from the following description given with reference to the accompanying figures, in which:

FIG. 1 diagrammatically shows drop-and-insert apparatus that is described above;

FIGS. 2 and 3 diagrammatically show two examples of prior art reconfigurable filters that are also described above; and FIG. 4 diagrammatically shows a reconfigurable filter of the invention.

MORE DETAILED DESCRIPTION

The filter shown in FIG. 4 is constituted by an optical switch K and by $\underline{n}$ stop filters Fl, F2, Fi, Fk, Fn. Each filter is organized to stop (and to reflect for drop-and-insert applications) one or more channels of a received wavelength division multiplex We.

The switch K is provided with n+1 outlet ports of ranks 1 to n: E0, El, Ei, Ek, En, and n+1 outlet ports of ranks 1 to n+1: S1, S2, Si, Sk, Sn+1.

Each of the filters, e.g. Fk, is provided with first and second opposite ports Pe, Ps coupled respectively to an outlet port Sk and to an inlet port Ek of the same rank of the switch K.

A set of waveguides of the switch K, such as Gi, Gk, Gn+1, activated as a function of a suitable command CD, makes it possible selectively to couple each outlet port, e.g. Sk, to one of the inlet ports, e.g. Ei, having a lower rank.

The first inlet port E0, of rank 0, is organized to receive the input multiplex signal We and the last outlet port Sn+1, of rank n+1, is organized to deliver an output optical signal Ws.

By means of this configuration, the switch K makes it possible to couple the input signal We to any one of the filters or to a plurality of said filters selectively coupled in cascade. For example, with the waveguides Gi, Gk and Gn+1 being in the positions shown, the input signal We passes through the filters Fi and Fk and then exits via the port Sn+1. This also results in the channels carried by the stop wavelengths of the filters being reflected to the port E0.

Implementing the apparatus practically poses no particular difficulties. As regards the switch K, it is possible to choose any type of implementation derived from those of known crossbar switches and advantageously by making use of the fact that each outlet port Sk does not need to be coupled to the inlet ports of higher or equal rank Ek, Ek+1, . . . , En. By way of example, such a crossbar switch may be based on the SG2000 series sold by JDS FITEL.

As indicated above, the switch may also be a static switch based on 1-to-N fan-out couplers interconnected with N'-to-1 combiner couplers via controlled optical gates. In which case, the number of interconnection waveguides between couplers and the number of optical gates can be lower than in a conventional static crossbar structure.

If the switch is implemented by means of moving optical waveguides that are actuated electro-mechanically, it is also possible to simplify implementation compared with that of a usual crossbar because, with the couplings between the filters and the switch being disposed appropriately, it is possible to avoid any crossing over of the waveguides of the switch, and they can thus all be placed in the same plane. For this purpose, it is merely necessary, for example, for each inlet port of rank $\underline{k}$ to be placed facing the outlet port of rank k+1. Such a disposition is shown in FIG. 4.

As regards the implementation of the filters, one convenient solution consists in implementing Bragg gratings photo-inscribed in the fibers.

The insertion losses generated by the switch of the filtering apparatus of the invention may be evaluated as follows.

For simplification purposes, it is assumed that the unit loss due to a wave travelling along a waveguide of the switch is independent of the waveguide in question and takes the value $\epsilon$.

If D is the number of filters through which the wave We passes, $\underline{k}$ is the rank of a particular filter Fk through which said wave passes, and $\underline{d}$ is the number of filters through which said wave passes upstream from the filter of rank $\underline{k}$, the following losses occur:

(D+1)ε, for each of the non-reflected channels; and

2(d+1)ε, for the channel reflected by the filter of rank k.

By way of comparison, for the example shown in FIG. 2, the following respective losses occur: (D+n)ε and 2(d+k)ε.

For the example shown in FIG. 3, the following respective losses occur: (1+n)ε and 2kε.

What is claimed is:

1. Optical filtering apparatus including n stop filters set to different wavelengths or to different combs of wavelengths, and optical switching means having a plurality of states and suitable for coupling an input optical signal to any one of said filters or to a plurality of said filters selectively coupled in cascade, wherein said switching means are provided with n+1 inlet ports of ranks 0 to n, and n+1 outlet ports of ranks 1 to n+1, as well as a set of waveguides making it possible to couple each outlet port selectively to one of said inlet ports of lower rank, wherein, with each of said filters being provided with first and second opposite ports, the first port and the second port of each filter are coupled respectively to an associated outlet port and to an associated inlet port of the same rank of said switching means, and wherein the inlet port of rank 0 is organized to receive said input optical signal, and the outlet port of rank n+1 is organized to deliver an output optical signal.

2. Apparatus according to claim 1, wherein said switching means are not organized to be capable of coupling each outlet port to said inlet ports having ranks higher than or equal to the rank of said outlet port.

3. Apparatus according to claim 2, wherein, with said switching means including a set of n+1 moving waveguides making it possible for said output ports to be selectively coupled to said inlet ports, the couplings between said filters and said switching means are organized such that no waveguide of said set crosses over any other waveguide, regardless of the state of said switching means.

4. Apparatus according to claim 3, wherein said switching means are organized such that each inlet port of rank k is placed facing the outlet port of rank k+1.

5. Selective drop apparatus for selectively dropping one or more channels of a wavelength multiplex, said apparatus comprising:

reflective stop optical filtering apparatus provided with first and second opposite access ports;

inlet coupling means coupled to said first access port and provided with an inlet port suitable for receiving said multiplex and with a drop port, said inlet coupling means being organized to inject at least some of the waves received via its inlet port into the filtering apparatus, and to emit, via its drop port, at least some of the waves received from said first access port; and outlet coupling means coupled to said second access port;

wherein said filtering apparatus is filtering apparatus according to claim 1.

6. Selective insert apparatus for selectively inserting one or more channels of a wavelength division multiplex, said apparatus comprising:

reflective stop optical filtering apparatus provided with first and second opposite access ports;

inlet coupling means coupled to said first access port and suitable for injecting said multiplex into the filter;

outlet coupling means coupled to said access port and provided with an outlet port and an insert port, said output coupling means being organized to inject at least some of the waves received via its insert port into the filter, and to emit, via its outlet port, at least some of the waves received from said second access port; wherein said filtering apparatus is filtering apparatus according to claim 1.

7. Selective drop and/or insert apparatus for selectively dropping and/or inserting one or more channels of a wavelength division multiplex, said apparatus comprising:

reflective stop optical filtering apparatus provided with first and second opposite access ports;

inlet coupling means coupled to said first access port and provided with an inlet port suitable for receiving said multiplex and with a drop port, said inlet coupling means being organized to inject at least some of the waves received via its inlet port into the filter, and to emit, via its drop port, at least some of the waves received from said first access port; and outlet coupling means coupled to said second access port and provided with an outlet port and an insert port, said outlet coupling means being organized to inject at least some of the waves received via its insert port into the filter, and to emit, via its outlet port, at least some of the waves received from said second access port;

wherein said filtering apparatus is filtering apparatus according to claim 1.

* * * * *